(12) United States Patent
Oakley, Jr.

(10) Patent No.: US 10,250,068 B2
(45) Date of Patent: Apr. 2, 2019

(54) SOLAR POWERED RECHARGEABLE DEVICE FOR USE WITH AN ELECTRONIC DEVICE AND METHOD OF USE THEREOF

(71) Applicant: Gary William Oakley, Jr., Woodstock, NY (US)

(72) Inventor: Gary William Oakley, Jr., Woodstock, NY (US)

( * ) Notice: Subject to any disclaimer, the term of this patent is extended or adjusted under 35 U.S.C. 154(b) by 0 days.

(21) Appl. No.: 15/864,130

(22) Filed: Jan. 8, 2018

(65) Prior Publication Data

US 2018/0138738 A1    May 17, 2018

Related U.S. Application Data

(63) Continuation of application No. 14/886,551, filed on Oct. 19, 2015, now Pat. No. 10,084,340, which is a continuation of application No. 13/839,362, filed on Mar. 15, 2013, now Pat. No. 9,166,424, which is a continuation-in-part of application No. 12/956,694, filed on Nov. 30, 2010, now abandoned.

(51) Int. Cl.
| | |
|---|---|
| *H02J 7/00* | (2006.01) |
| *H01M 10/44* | (2006.01) |
| *H01M 10/46* | (2006.01) |
| *H02J 7/35* | (2006.01) |

(52) U.S. Cl.
CPC ........... *H02J 7/355* (2013.01); *H01M 10/465* (2013.01); *H02J 7/007* (2013.01); *H02J 7/0045* (2013.01); *H01M 10/44* (2013.01)

(58) Field of Classification Search
CPC ........................................................ H02J 7/35
USPC ......................................................... 320/101
See application file for complete search history.

(56) References Cited

U.S. PATENT DOCUMENTS

| | | | |
|---|---|---|---|
| 4,421,943 A | * | 12/1983 | Withjack ............... F24J 2/5264 |
| | | | 126/569 |
| 5,379,596 A | | 1/1995 | Grayson |
| 5,520,747 A | | 5/1996 | Marks |

(Continued)

FOREIGN PATENT DOCUMENTS

| | | |
|---|---|---|
| CN | 201352722 Y | 11/2009 |
| DE | 20107555 U1 | 1/2002 |

(Continued)

OTHER PUBLICATIONS

Non-Final Office Action for U.S. Appl. No. 14/886,551, filed Oct. 19, 2015, dated Jan. 21, 2016.

(Continued)

*Primary Examiner* — Edward Tso
*Assistant Examiner* — Ahmed Omar
(74) *Attorney, Agent, or Firm* — Schmeiser, Olsen & Watts, LLP

(57) ABSTRACT

A solar powered device comprising a solar radiation collection portion, wherein the solar radiation collection portion includes: a solar panel to collect solar radiation, a concentrator surrounding the solar panel to concentrate the solar radiation, and a charge controller coupled to the solar panel, a base portion, a plurality of legs, and a connection portion operably connecting the solar radiation collection portion to the base portion, the connection portion including a connection member having a first end and a second end is provided. Furthermore, an associated method is also provided.

15 Claims, 16 Drawing Sheets

(56) References Cited

U.S. PATENT DOCUMENTS

| | | | |
|---|---|---|---|
| 5,522,943 A | 6/1996 | Spencer et al. | |
| 5,701,067 A | 12/1997 | Kaji et al. | |
| 5,798,517 A * | 8/1998 | Berger | F24J 2/38 |
| | | | 126/573 |
| 5,855,692 A | 1/1999 | Kaji et al. | |
| 6,323,415 B1 | 11/2001 | Uematsu et al. | |
| 6,737,573 B2 | 5/2004 | Yeh | |
| 6,977,479 B2 | 12/2005 | Hsu | |
| 7,230,819 B2 | 6/2007 | Muchow | |
| 8,008,887 B2 | 8/2011 | Lee | |
| 9,166,424 B2 | 10/2015 | Oakley, Jr. | |
| 10,084,340 B2 | 9/2018 | Oakley | |
| 2003/0075213 A1 * | 4/2003 | Chen | H01L 31/0543 |
| | | | 136/246 |
| 2005/0092356 A1 | 5/2005 | Sakai | |
| 2006/0012331 A1 | 1/2006 | Gillette | |
| 2007/0278989 A1 | 12/2007 | Leboff | |
| 2008/0061732 A1 | 3/2008 | Lin et al. | |
| 2009/0039705 A1 | 2/2009 | Lyman | |
| 2010/0060229 A1 | 3/2010 | Withjack | |
| 2011/0163711 A1 | 7/2011 | Kiss | |
| 2011/0193512 A1 * | 8/2011 | Singhal | F03D 9/007 |
| | | | 320/101 |
| 2012/0133321 A1 | 5/2012 | Oakley, Jr. | |
| 2013/0240015 A1 | 9/2013 | Chaimovski et al. | |
| 2016/0043591 A1 | 2/2016 | Oakley, Jr. | |

FOREIGN PATENT DOCUMENTS

| | | |
|---|---|---|
| FR | 2691290 A1 | 11/1993 |
| GB | 2288290 A | 10/1995 |
| GB | 2371157 A | 7/2002 |
| JP | 3147740 U | 12/2008 |
| KR | 20100023438 | 3/2010 |
| WO | 2005029673 A1 | 3/2005 |

OTHER PUBLICATIONS

Final Office Action for U.S. Appl. No. 14/886,551, filed Oct. 19, 2015, dated Jun. 16, 2016.
Non-Final Office Action for U.S. Appl. No. 14/886,551, filed Oct. 19, 2015, dated Nov. 18, 2016.
Final Office Action for U.S. Appl. No. 14/886,551, filed Oct. 19, 2015, dated Jun. 1, 2017.
Notice of Allowance for U.S. Appl. No. 14/886,551, filed Oct. 19, 2015, dated Sep. 13, 2017.
U.S. Appl. No. 12/956,694, filed Nov. 30, 2010.
Non-Final Office Action for U.S. Appl. No. 13/839,362 (filed Mar. 15, 2013) dated Apr. 17, 2015.
Notice of Allowance for U.S. Appl. No. 13/839,362 (filed Mar. 15, 2013) dated Aug. 12, 2015.
Non-Final Office Action for U.S. Appl. No. 12/956,694 (filed Nov. 30, 2010) dated Jun. 20, 2013.
Anonymous, Lightweight Fold-up Solar Charger for AA Batteries, Advanced Battery Technology; Sep. 2005; 41, 9; Technology Collection p. 18.

* cited by examiner

SOLAR POWERED RECHARGEABLE DEVICE FOR USE WITH AN ELECTRONIC DEVICE AND METHOD OF USE THEREOF

CROSS-REFERENCE TO RELATED APPLICATIONS

This application is a continuation application of U.S. application Ser. No. 14/886,551, filed on Oct. 19, 2015 which is a continuation application of Ser. No. 13/839,362, filed Mar. 15, 2013, and entitled, "Solar Powered Rechargeable Device For Use With An Electronic Device and Method of Use Thereof," which is a continuation-in-part of U.S. application Ser. No. 12/956,694, filed Nov. 30, 2010, and entitled, "Solar Powered Rechargeable Device for Use With an Electronic Device and Method of Use Thereof."

FIELD OF TECHNOLOGY

The following relates to a solar powered battery unit, and more specifically to embodiments of a solar powered battery unit for charging an electronic device.

BACKGROUND

Electronic devices, similar to those used in telecommunications, typically operate with the use of a rechargeable battery to power the electronic device. To recharge the battery, an electrical current is applied to the battery to electrically reverse the electrochemical reactions that previously generated electricity, for future conversion into electricity. Typically, the source of the electrical current to charge a battery is alternating current (AC) mains electricity. For instance, a micro-USB cable can connect an electronic device to a wall receptacle delivering AC electricity to charge the battery of the electronic device.

Although plugging an electronic device into an AC power source is sufficient to charge a battery of an electronic device, an AC power source is not always available. For example, a person stranded or simply working in the field with no means of generating sustainable electricity cannot simply plug the device into a cable charger connected to a wall receptacle. Without a conventional AC power source to recharge the battery, the electronic device will eventually fail. Moreover, consumption of the electricity and electricity generation can be harmful to the environment, and harmful to a person's finances.

Thus, a need exists for an apparatus and method for charging a battery and/or an electronic device with an alternate power source, in particular, solar cell technology.

SUMMARY

A first general aspect relates to a device comprising a solar radiation collection portion, wherein the solar radiation collection portion includes: a first solar panel to collect solar radiation, a concentrator positioned a distance above the first solar panel to concentrate the solar radiation, and a charge controller coupled to the first solar panel, the charge controller electrically coupled to a first receptacle, a base portion, the base portion including a battery unit, a plurality of legs, wherein a second receptacle is electrically coupled to the battery unit, and a connection portion operably connecting the solar radiation collection portion to the base portion, the connection portion including a connection member having a first end and a second end.

A second general aspect relates to a solar powered rechargeable device comprising a first solar panel having a first side and a second side, the first solar panel being foldable into a plurality of sectors and configured to collect solar radiation, a battery unit having a plurality of legs and a battery plug electrically coupled thereto, a connection portion connecting the first solar panel to the battery unit, wherein the connection portion erects the first solar panel, a charge controller coupled to the second side of the first solar panel, wherein the converter controls the electrical energy converted by the first solar panel, a first receptacle electrically coupled to the charge controller, the first receptacle configured to accept an electrical plug from an electronic device to establish a first electrical connection, and a second receptacle electrically coupled to the battery unit, the second receptacle configured to accept the electrical plug from an electronic device to establish a second electrical connection.

A third general aspect relates to a method of charging an electronic device comprising collecting solar radiation with a first solar panel, wherein the first solar panel is foldable into a plurality of sectors, positioning a concentrator a distance above the first solar panel to concentrate the solar radiation onto a portion of the first solar panel, structurally connecting a battery unit to the first solar panel, wherein the battery unit has a plurality of legs to provide stability, electrically coupling a first receptacle to the first solar panel to transfer electrical energy from the first solar panel to at least one of the battery unit and an electronic device, and mating the first receptacle with the electronic device to charge the electronic device.

A fourth aspect relates generally to a device comprising: a solar radiation collection portion, wherein the solar radiation collection portion includes: a solar panel to collect solar radiation, a concentrator surrounding the solar panel to concentrate the solar radiation, and a charge controller coupled to the solar panel; a base portion, a plurality of legs; and a connection portion operably connecting the solar radiation collection portion to the base portion, the connection portion including a connection member having a first end and a second end.

A fifth aspect relates generally to a solar powered rechargeable device comprising: a solar panel disposed on an inner reflective surface of a concentrator, the concentrator configured to collect and direct solar radiation towards the solar panel; a battery unit having a plurality of legs and a battery plug electrically coupled thereto; a connection portion connecting the solar panel to the battery unit, wherein the connection portion erects the solar panel; a charge controller coupled to the second side of the solar panel, wherein the converter controls the electrical energy converted by the solar panel; a first receptacle electrically coupled to the charge controller, the first receptacle configured to accept an electrical plug from an electronic device to establish a first electrical connection; and a second receptacle electrically coupled to the battery unit, the second receptacle configured to accept the electrical plug from an electronic device to establish a second electrical connection.

A sixth aspect relates generally to a method of charging an electronic device comprising: collecting solar radiation with a solar panel being encompassed by a concentrator, wherein the concentrator has a parabolic shape and an inner reflective surface to concentrate the solar radiation onto a portion of the first solar panel; structurally connecting a battery unit to the solar panel, wherein the battery unit has a plurality of legs to provide stability; electrically coupling a first receptacle to the solar panel to transfer electrical energy from the first solar panel to at least one of the battery unit and an electronic device; and mating the first receptacle with the electronic device to charge the electronic device.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

As a preface to the detailed description, it should be noted that, as used in this specification and the appended claims, the singular forms "a", "an" and "the" include plural referents, unless the context clearly dictates otherwise.

Figure 1:
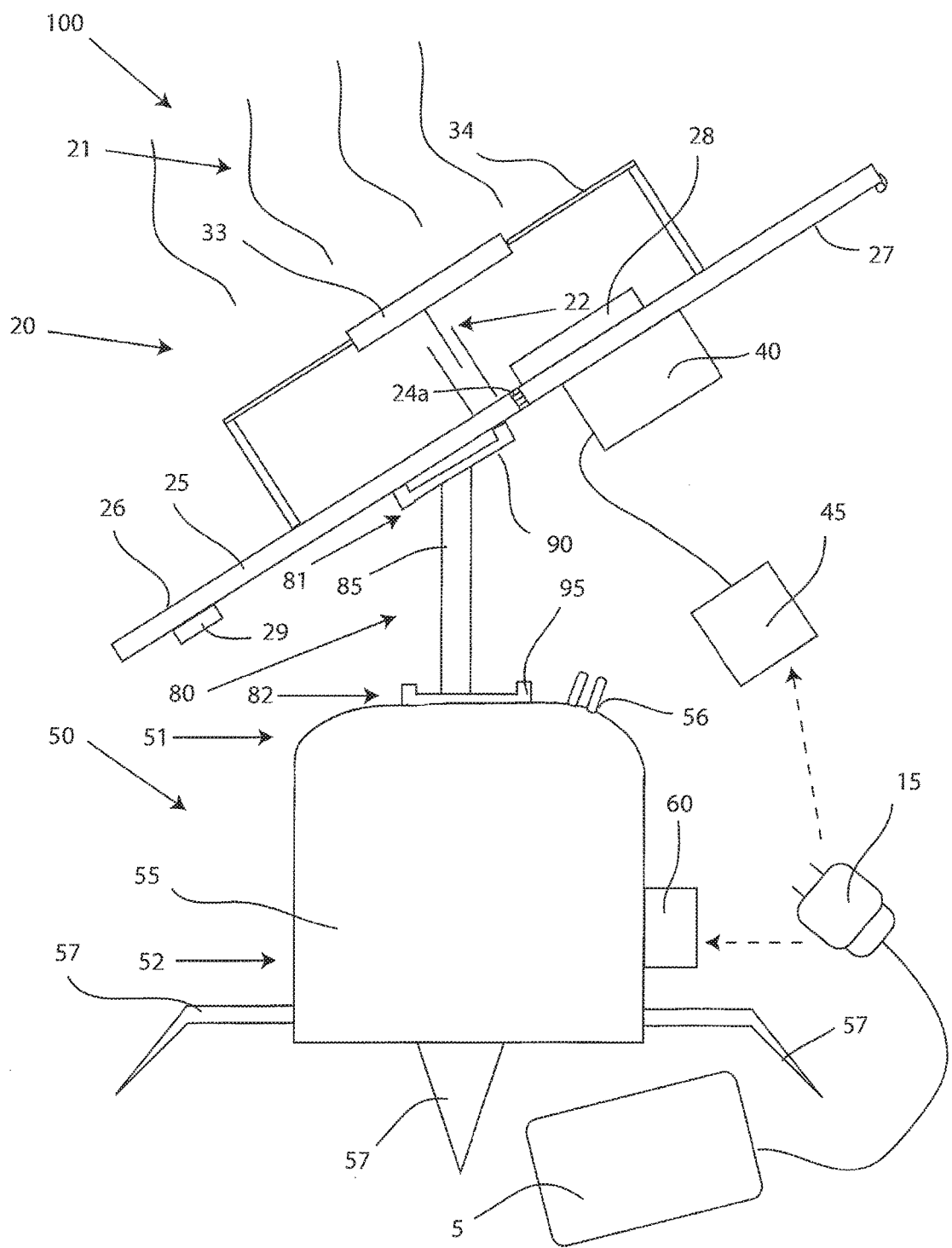
FIG. 1 depicts a side view of an embodiment of a solar powered rechargeable device.

Referring to the drawings, FIG. 1 depicts an embodiment of a solar powered rechargeable device 100. The solar powered rechargeable device 100 may charge an electronic device 5 directly or indirectly. Direct charging of an electronic device 5 may occur through electrical communication between the solar radiation collection portion 20 and the electronic device 5. For instance, the electronic device 5 may plug into a receptacle coupled to a solar panel to receive electrical energy to charge the battery housed within an electronic device 5. Indirect charging of an electronic device 5 may occur through the electrical communication between the base portion 50 and the electronic device 5. For instance, the electronic device 5 may plug into a receptacle coupled to the battery unit 55 to receive electrical energy to charge the battery housed within an electronic device 5. The solar powered rechargeable device 100 may also be referred to as a solar panel battery unit, a solar cell rechargeable device, a photovoltaic battery charging device, and the like.

Embodiments of device 100 may include a solar radiation collection portion 20, wherein the solar radiation collection portion 20 includes a first solar panel 25 to collect solar radiation 21, a concentrator 33 positioned a distance above the first solar panel 25 to concentrate, focus, reflect, refract, converge, etc., the solar radiation 21 (i.e. concentrated solar radiation 22), and a charge controller 40 coupled to the first solar panel 25, the charge controller 40 electrically coupled to a first receptacle 45, a base portion 50, the base portion 50 including a battery unit 55, a plurality of legs 57, wherein a second receptacle 60 is coupled to the battery unit 55, and a connection portion 80 operably connecting the solar radiation collection portion 20 to the base portion 50, the connection portion 80 including a connecting member 85 having a first end 81 and a second end 82. Further embodiments of device 100 may include a first solar panel 25 having a first side 26 and a second side 27, the first solar panel 25 being foldable into a plurality of sectors 22 and configured to collect solar radiation 21, a battery unit 55, wherein a plurality of legs 57 and a battery plug 56 are attached thereto, a connection portion 80 connecting the first solar panel 25 to the battery unit 55, wherein the connection portion 80 erects the first solar panel 25, and a charge controller 40 coupled to the second side 27 of the first solar panel 25, wherein the charge controller 40 controls the electrical energy converted by the first solar panel 25 (and second solar panel 28), a first receptacle 45 electrically coupled to the charge controller 40, the first receptacle 45 configured to accept an electrical plug 15 from an electronic device 5 to establish a first electrical connection, and a second receptacle 60 externally coupled to the battery unit 55, the second receptacle 60 configured to accept the electrical plug 15 from an electronic device 5 to establish a second electrical connection.

Embodiments of the solar radiation collection portion 20 of device 100 may include a first solar panel 25, a second solar panel 28, a concentrator 33, a charge controller 40, a first receptacle 45 electrically coupled to the charge controller 40, and a counterweight 29. The solar radiation collection portion 20 may collect, accept, absorb, catch, etc., solar radiation, for example, electromagnetic radiation from the sun. The solar radiation collection portion 20 may be operably connected to the base portion 50, and may be variably adjusted (e.g. position angle with respect to the surface of the Earth, face angle with respect to the position of the Sun, tilt, etc.) to achieve optimal radiation collection.

Figure 2A:
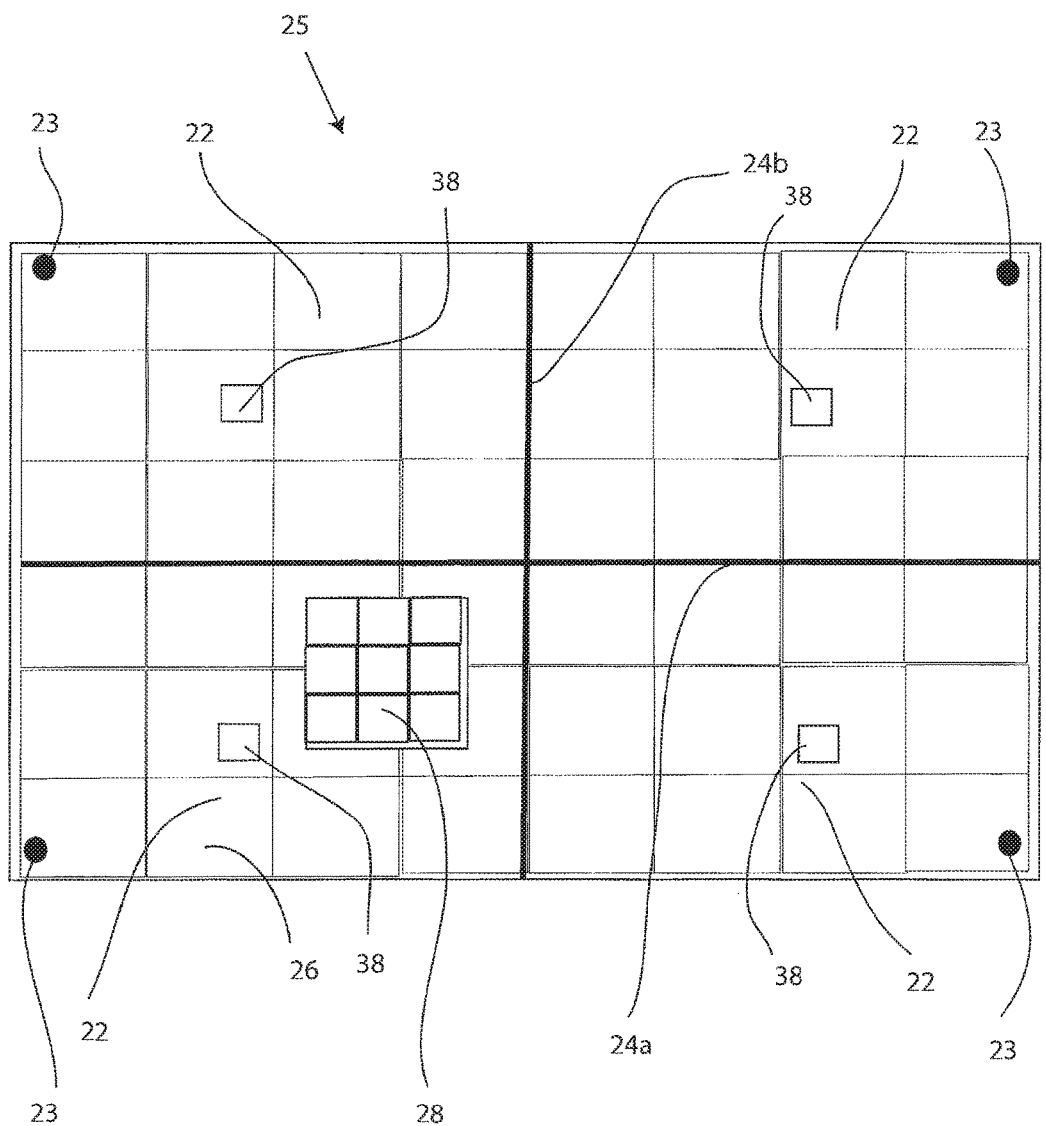
FIG. 2A depicts a top view of an embodiment of a first solar panel and a second solar panel.

Referring now to FIG. 2A, embodiments of the solar radiation collection portion 20 may include a first solar panel 25. The first solar panel 25 may include a first side 26, or first surface, and a second side 27, or second surface. The first solar panel 25 may also include a transversal hinge 24a and a longitudinal hinge 24b which may allow the first solar panel 25 to be folded, pivoted, etc., to reduce the size of the first solar panel 25 for storage, transportation, and the like. Moreover, the first solar panel 25 may be a solar panel, a photovoltaic module, a photovoltaic panel, and the like, having a packaged interconnected assembly of solar cells or photovoltaic cells. For example, the first solar panel 25 may be composed of several layers, wherein each layer may be a structural or load carrying layer, reflective layer, absorbing layer, cooling layer, photoactive layer, etc. The structural layer may be made of glass or other materials meeting structural requirement, transparency requirements, cost requirements, manufacturing requirements, and other requirements known to those having skill in the art. Additionally, the structural layer may be flexible or rigid. The photoactive layer may be composed of materials such as semiconductors that show photoactivity, and may be associated with the structural layer by various methods such as laying or deposition on the structural layers forming photovoltaic units or modules. Photoactive materials may be amorphous or crystalline, mono or poly crystalline structures, and/or elements or compounds including, but not limited to, silicon, cadmium, halogens, mercury, zinc, iridium, tellurium, copper, gold, silver, gallium, arsenides, selenium, organic or polymer materials, and/or a combination thereof. The first solar panel 25 may include different kinds of photovoltaic cells. For example, the photovoltaic cells may be rigid, flexible, thin film, bulk cell, etc., and can be produced by changing the method of association with the structural layer.

Accordingly, the photovoltaic cells of the first solar panel 25 may be interconnected by various methods in series or parallel to meet voltage and/or current requirements. Connection between photovoltaic cells may be achieved by using a perimeter connector, a conductive grid on the upper and/or lower surface of the photoactive layer or by a thin layer of conductive material. The connections may be a positive type and a negative type depending on the type of photoactive material connected by the connection. If a positive type connection is connected to another positive type connection, it results in a parallel connection. Likewise, if a negative type connection is connected to another negative type connection, it results in a parallel connection. When a positive type connection is connected to a negative connection, or vice versa, it results in a series connection. One having skill in the art should appreciate that a higher voltage may be achieved by increasing the number of series connection and a higher current may be achieved by increasing the number of parallel connections. Moreover, the productivity of the first solar panel 25 may depend on the number or density of incident photons on the photoactive layer. As a photon hits a photoactive material unit or layer of the first solar panel 25 (and potentially a second solar panel 28), the energy of the photon is absorbed or used by the material to excite and delocate an electron; the delocation of the electron(s) thus creates a flow of electrical energy. As this process repeats, a flow of many electrons create a flow of current (electrical energy) though a closed circuit. Therefore, the electrical energy, or current, generated may be harnessed to power an electrical device or to charge a battery.

Figure 3:
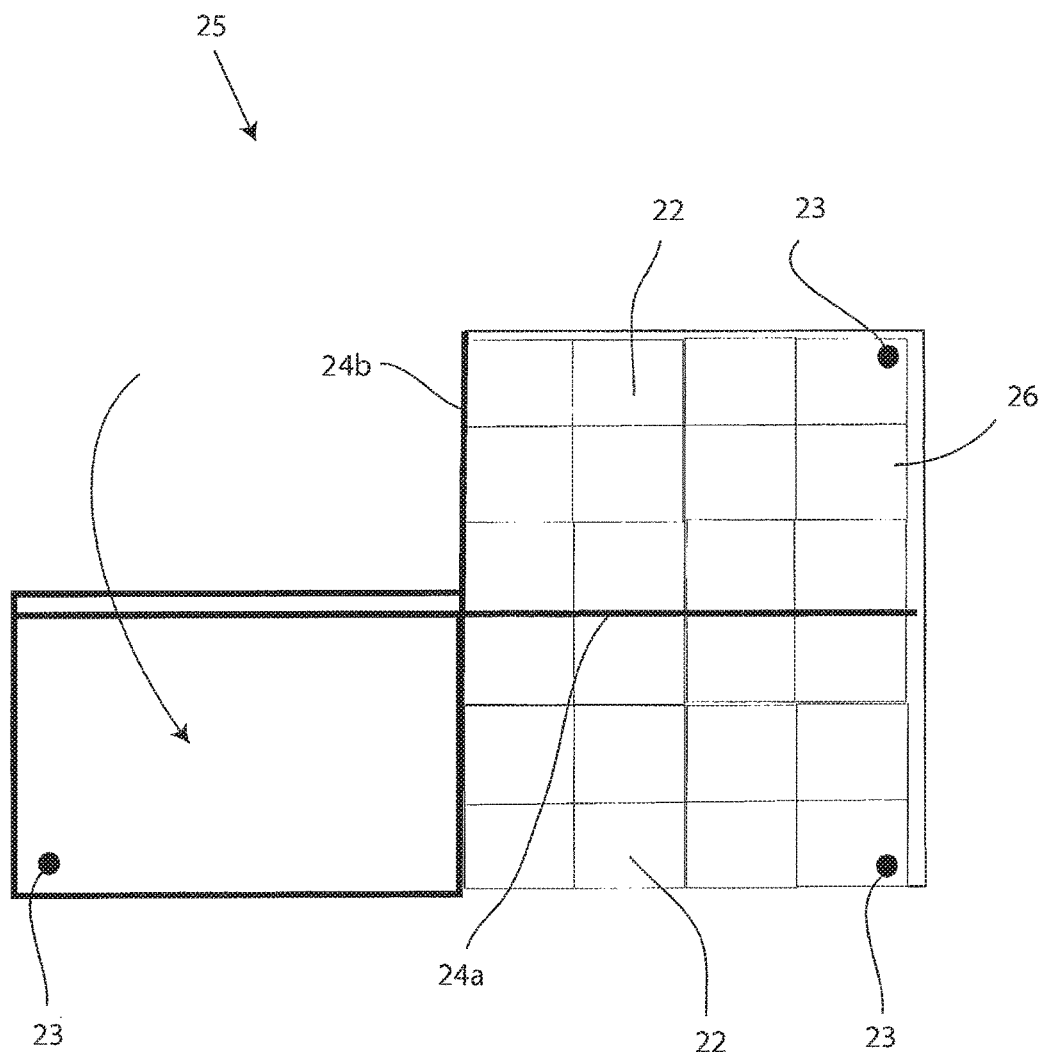
FIG. 3 depicts a top view of a first embodiment of the first solar panel partially folded.

Referring still to FIG. 2A, the first solar panel 25 may include a plurality of sectors 22. The plurality of sectors 22 may each be a portion, a predetermined portion, a subdivided portion, and the like, of the first solar panel 25, and may be divided, subdivided, separated, etc., by the transversal hinge 24a and the longitudinal hinge 24b. For instance, the first solar panel 25 may include four sectors 22 divided by the transversal hinge 24a and longitudinal hinge 24b, wherein each sector 22 may be referred to as a quadrant. Other embodiments of the first solar panel 25 may include less than four sectors 22, or more than four sectors 22, depending on the size of the first solar panel 25, the foldable arrangement of the first solar panel 25, and/or thickness of the first solar panel 25. Increasing or decreasing the number of sectors 22 may require additional hinges or an elimination of a hinge(s) to achieve the necessary separation and/or folding of the sectors 22. The transversal hinge 24a and the longitudinal hinge 24b separating the plurality of sectors 22 may be a hinge, pivot, joint, or similar mechanical device, that may allow each sector 22 of the first solar panel 25 to pivot, fold, etc., over the transversal hinge 24a and/or over the longitudinal hinge 24b. FIG. 3 depicts an embodiment of the first solar panel 25, wherein one of the plurality of sectors 22 is folded over the transversal hinge 24a onto a sector 22 below. In other words, if the first solar panel 25 includes four sectors 22, (e.g. four quadrants), the sector 22 in the first quadrant (i.e. upper left) may be folded over the transversal hinge 24a onto the sector 22 in the fourth quadrant (i.e. lower left). Because the sector 22 in the first quadrant is not mechanically coupled, through hinged means or otherwise, to the sector 22 in the second quadrant, (i.e. upper right), movement of the sector 22 in the first quadrant over the transversal hinge 24a may not be hindered or prevented. However, to prevent the sector 22 in the first quadrant from collapsing when the first solar panel 25 is in the collection or fully deployed position (as in FIG. 2A), a latching means may be used to removably secure the sector 22 in the first quadrant to the sector 22 in the second quadrant.

Figure 4:
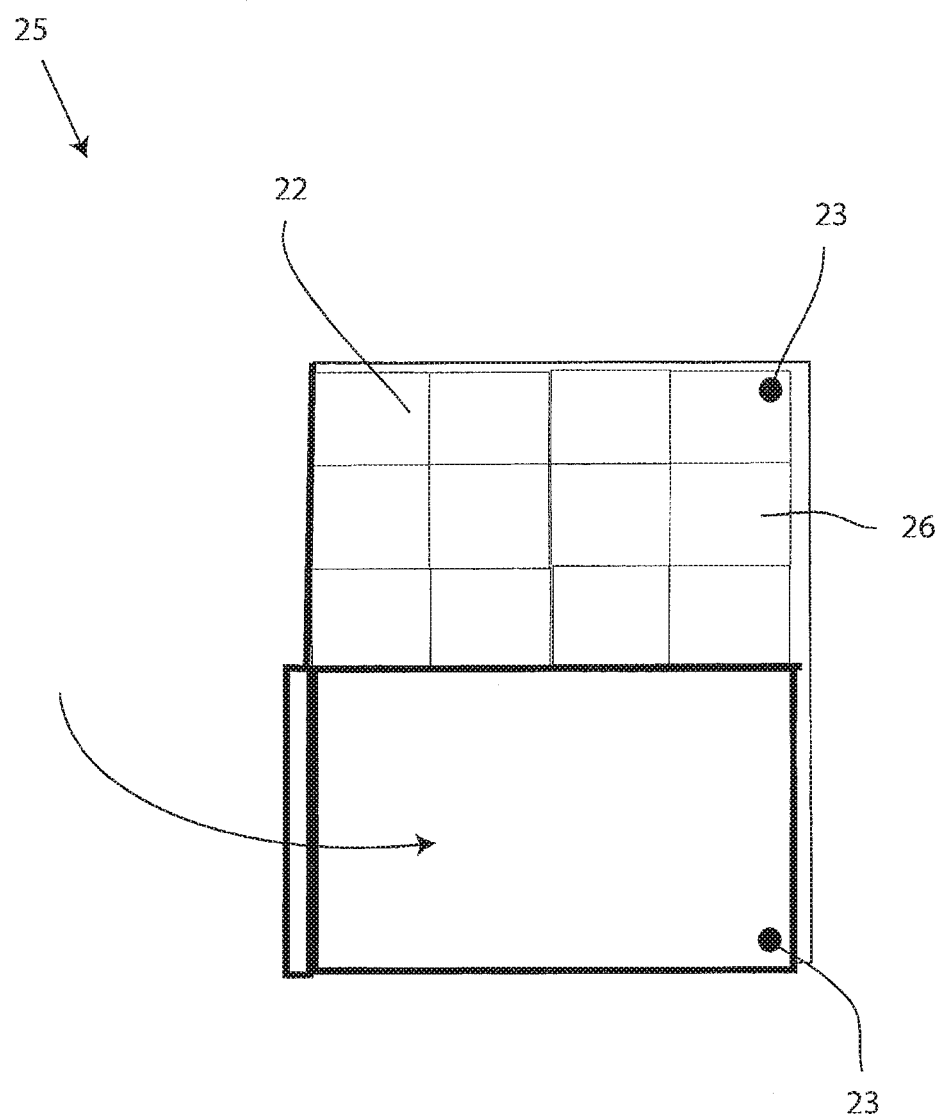
FIG. 4 depicts a top view of a second embodiment of the first solar panel partially folded.
Figure 5:
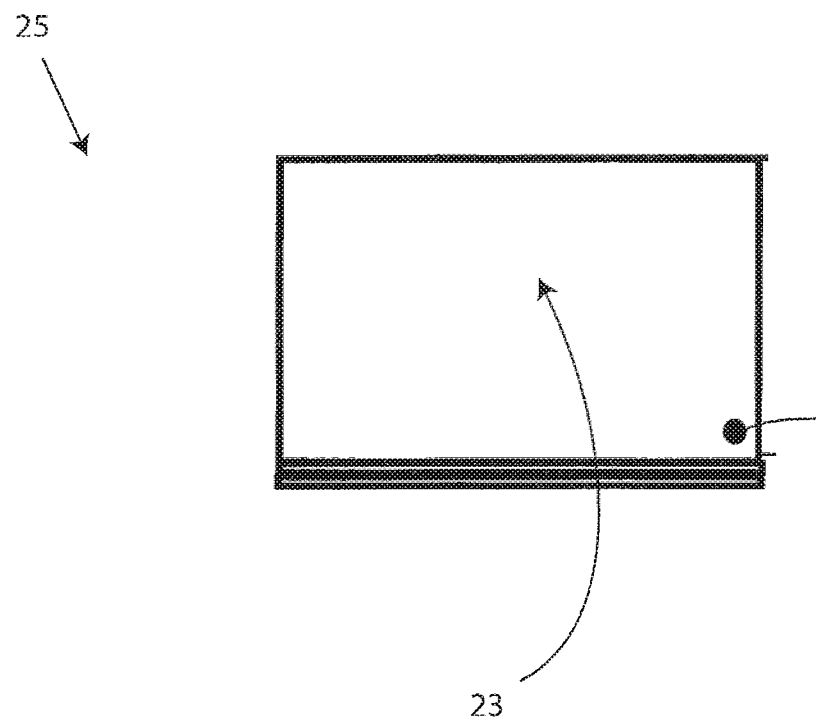
FIG. 5 depicts a top view of a third embodiment of the first solar panel in a completely folded position.
Figure 6:
FIG. 6 depicts a cross-section view of an embodiment of the first solar panel in the completely folded position.

FIG. 4 depicts an embodiment of a partially folded first solar panel 25, wherein two of the plurality of sectors 22 are now folded over the longitudinal hinge 24b onto the sector 22 in the third quadrant (i.e. lower right). Similarly, FIG. 5 depicts an embodiment of a fully folded first solar panel 25, wherein three folded sectors 22 are folded over the transversal hinge 24a onto the sector 22 in the second quadrant. In the fully folded position, the first solar panel 25 may be one-fourth in size, and may easily be stored away in a pocket, backpack, or other compartment. Each sector 22 of the first solar panel 25 may include an opening 23. Opening 23 may be an opening, hole, bore, tunnel, space, and the like extending from the first side 26 of the first solar panel 25 through the second side 27 of the first solar panel 25. When the first solar panel 25 is in a fully folded position, the openings 23 on each of the plurality of sectors 22 may align, forming an opening extending through the fully folded first solar panel 25, as shown in FIG. 6. Thus, a fastener, or a fastening means, may be passed through the openings 23 to removably secure the first solar panel 25 in the fully folded position, and may prevent the unfolding of the first solar panel 25. Those having skill in the requisite art should appreciate that the manner in which the first solar panel 25 is foldable may vary in the folding order of the sectors 22, the mechanical means to achieve the necessary pivots, fold, etc., and the manner in which the first solar panel 25 is mechanically secured in the deployed position and in the fully folded position.

Referring back to FIG. 1 and with continued reference to FIG. 2A, a second solar panel 28 may be coupled to the first side 26 of the first solar panel 25. The second solar panel 28 may be electrically connected/coupled independently to a power receiving unit, such as charge controller 40, bypassing the first solar panel 25, or may be electrically coupled and mechanically coupled/attached to the first solar panel 25 directly. The second solar panel 28 may be coupled to the first solar panel 25 for various purposes. For example, the second solar panel 28 may be tuned to work most efficiently for a particular wavelength of light. The second solar panel 28 may be tuned for infrared light or monochromatic light when availability of the entire spectrum of light is compromised (e.g. clouds, shadows, etc). Furthermore, the second solar panel 28 may be a different photovoltaic module, or solar panel, than the first solar panel 25. For instance, the second solar panel 28 may be a monocrystalline silicon wafer, while the first solar panel 25 may be a thin film photovoltaic module. In other embodiments, the second solar panel 28 may have a different chemical composition than the first solar panel 25. In further embodiments of the solar radiation collection portion 20, the second solar panel 28 may have different thermal characteristics than the first solar panel 25. Moreover, the second solar panel 28 may be a smaller panel, or module, than the first solar panel 25. Because the second solar panel 28 may be much smaller than the first solar panel 25, the second solar panel 28 may be designed to be highly photoefficient, which may be more expensive to manufacture than the first solar panel 25. Thus, the second solar panel 28 may be used to augment, back up, and/or replace power production of the first solar panel 25, including instances of malfunction of the first solar panel 25 (e.g. first solar panel 25 cannot be fully deployed or efficiently used). The second solar panel 28 may have a thin cross-section, or thickness, to avoid complicating (e.g. restricting the folds) the folding process of the first solar panel 25.

Figure 2B:
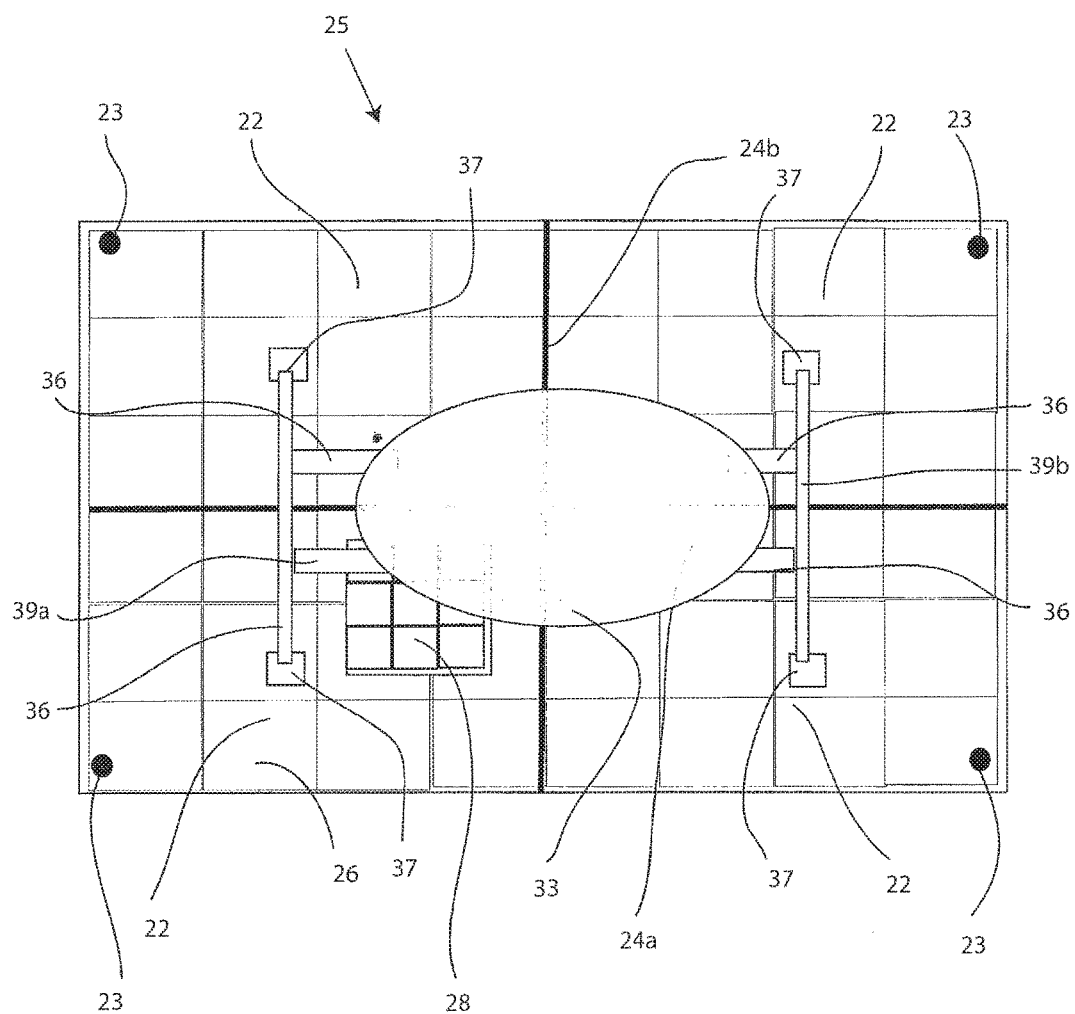
FIG. 2B depicts a top view of an embodiment of the first solar panel, second solar panel, and a concentrator.

With continued reference to FIG. 1, and additional reference to FIG. 2B, embodiments of the solar radiation collection portion 20 may include a concentrator 33. The concentrator 33 may be positioned a distance above the first solar panel 25 (and second solar panel 28) to concentrate, focus, reflect, refracts, etc., incoming solar radiation 21 into concentrated radiation 22. A concentrator 33 may be a single lens or a plurality of lenses, including a Fresnel lens, collimators, mirrors, such as a conversion mirror, or a combination thereof. Embodiments of concentrator 33 may be a lens that may transmit and/or refract incoming solar radiation 21, concentrating the incoming solar radiation 21 (i.e. converging or diverging the incoming solar radiation 21) towards a portion of the first solar panel 25 and/or a portion of the second solar panel 28. Other embodiments of the concentrator 33 may be a mirror that may be angularly adjusted to reflect incoming solar radiation 21 towards a portion of the first solar panel 25 and a portion of the second solar panel 28. The concentrator 33 may be used to focus, concentrate, etc., a large amount of incoming solar radiation 21 onto a specific portion of the surface of the first and second solar panels 25, 28. Furthermore, the concentrator 33 may allow and/or improve the use of a much smaller solar module, such as the second solar panel 28, having a high photoefficiency, by reducing material consumption and manufacturing costs. The concentrated radiation 22 may produce more heat in the first and second solar panels 25, 28; therefore, the concentrator 33 may be used in conjunction with a cooling mechanism such as a heat sink or radiator to keep the first and second solar panels 25, 28 within operable temperatures to maintain photoefficiency. Additional embodiments of concentrator 33 may also use antireflective layers in conjunction with the lenses.

Moreover, the concentrator 33 may be suspended above the first and second solar panels 25, 28 by a frame 34. The frame 34 may include a plurality of legs 37 connected to respective crossbars 39a, 39b. Each crossbar 39a, 39b, may have mechanical arms 36 to hold, support, accommodate, etc., a concentrator 33. In embodiments where the concentrator 33 is a mirror, the mechanical arms 36 may be movable (e.g. rotatable, hinged, pivotable, etc.) to angularly adjust the concentrator 33 to a desired angle with respect to the first and second solar panels 25, 28. The bottom of legs 37 of the concentrator frame 34 may be inserted into openings 38 positioned on the first solar panel 25, wherein the location of the openings 38 correspond to the dimensions of the frame 34 (e.g. the distance between the openings 38 on the first solar panel 25 may be equal to the distance between each leg 37). Openings 38 may be an opening, a bore, a cavity, a recession, and the like, having a cross-section that corresponds to the cross-section of legs 37, and may not extend/penetrate completely through the first solar panel 25. For example, openings 38 may extend a distance from the first side 26, but not through the second side 27 of the first solar panel 25. A portion of the legs 37, proximate the bottom of the legs 37, may rest inside the openings 38 deep enough to prevent the concentrator frame 34 from sliding off of the first solar panel 25. Alternatively, openings 38 may extend through the second side 27 of the first solar panel 25 if the legs 37 include flanges proximate the bottom of the legs 37, wherein the flanges have a larger area than the area of openings 38. The concentrator frame 34 may be fixedly secured to the first solar panel 25 through an additional fastener or fastening means, or may removably secured to the first solar panel 25 by simply inserting the legs 37 of the frame 34 into the openings 38 positioned on the first solar panel 25. Those skilled in the art should appreciate that embodiments of the concentrator frame 34 may be comprised of lightweight metal, such as aluminum, plastic, composites, alloys, or a combination thereof.

Figure 7:
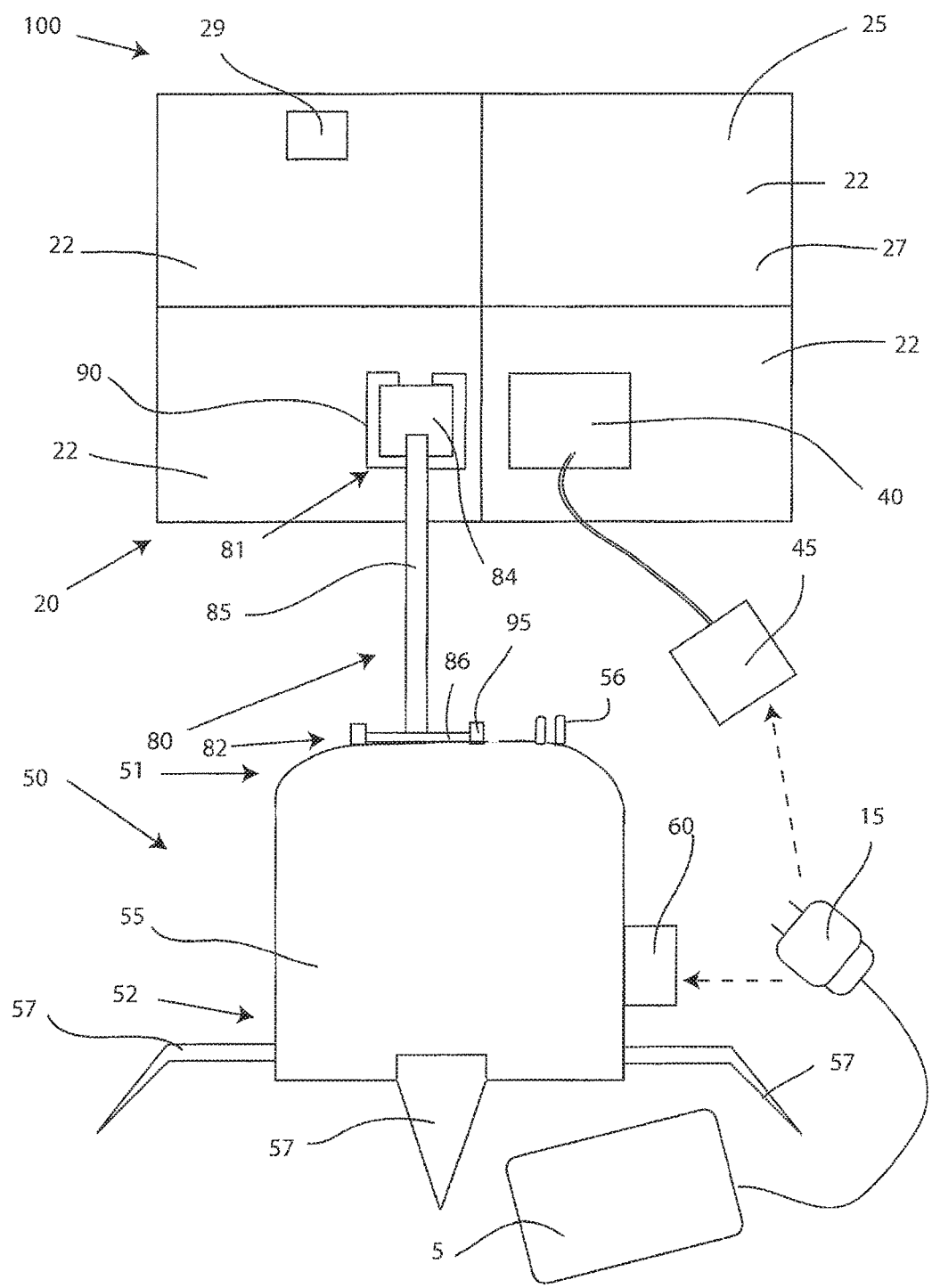
FIG. 7 depicts a rear view of an embodiment of the solar powered rechargeable device.

With continued reference to the drawings, FIGS. 1 and 7 depict an embodiment of the solar radiation collection portion 20 having a charge controller 40. The charge controller 40 may be physically coupled to the first solar panel 25 (e.g. mechanical communication between the charge controller 40 and the second side 27 of the first solar panel 25). In other words, the charge controller 40 may be coupled directly to the second side 27 of the first solar panel 25. For example, the charge controller 40, or its outer surface or outer housing, may be adhered to the first solar panel 25 while allowing/permitting an electrical connection between the first solar panel 25 and the charge controller 40. However, the structure of the charge controller 40 may have a thin cross-section to avoid complicating (e.g. restricting the folds) the folding process of the first solar panel 25. The charge controller 40 may also be electrically coupled to the first solar panel 25. The charge controller 40 may be electrically coupled to the first solar panel 25 by various methods, for example, by employing resilient conducting pins from the charge controller 40 which may contact conductive tracks on the first solar panel 25 or by employing conductive prongs soldered to a complimentary receptacle in the first solar panel 25. One having skill in the art should appreciate that such an arrangement may be reversed. Alternatively, the charge controller 40 may also be coupled to the first solar panel 25 via a cable conductor, avoiding direct contact with the first solar panel 25, and may be detached prior to folding the first solar panel 25.

Furthermore, embodiments of the charge controller 40 may be connected to positive and negative poles of the first solar panel 25 connector or grid, thus becoming a part of the closed circuit though which the migrating electrons can flow. The charge controller 40 may serve various functions including current regulation, checking back flow of current/ electrical energy, preventing overcharging or overdischarging of a battery, such as battery unit 55, and protecting the closed circuit from destructive surges in current. One having skill in the art should appreciate that charge controller 40 may be one or more diodes, transistors, integrated circuits, chips, relays or a combination thereof. Moreover, charge controller 40 may operate by regulating current flow by comparing it to a predetermined set value or values or range of current. For example, a simple diode based charge controller 40 can prevent the flow of current from the battery unit 55 to the first solar panel 25 while allowing current to flow from the first solar panel 25 (and potentially second solar panel 28) to the battery unit 55. Alternatively, a transistor based charge controller 40 can allow a certain level of current flow and would act as a switch if a current falls outside a predetermined set range. The charge controller 40 may also be an electromechanical device, such as a relay to switch the circuit on or off, depending on a certain set value.

Figure 12:
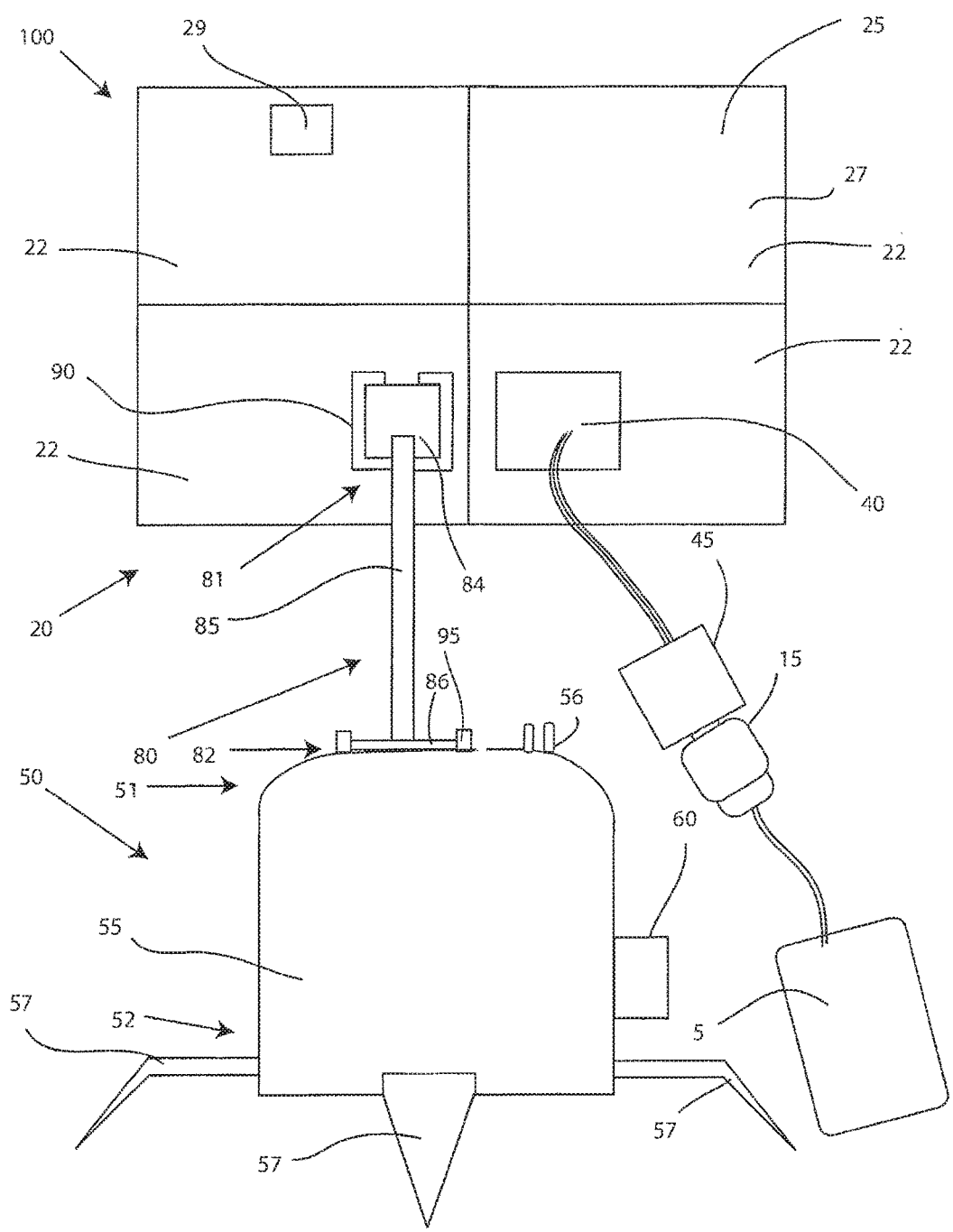
FIG. 12 depicts a rear view of an embodiment of the solar radiation collection portion charging the electronic device.
Figure 13:
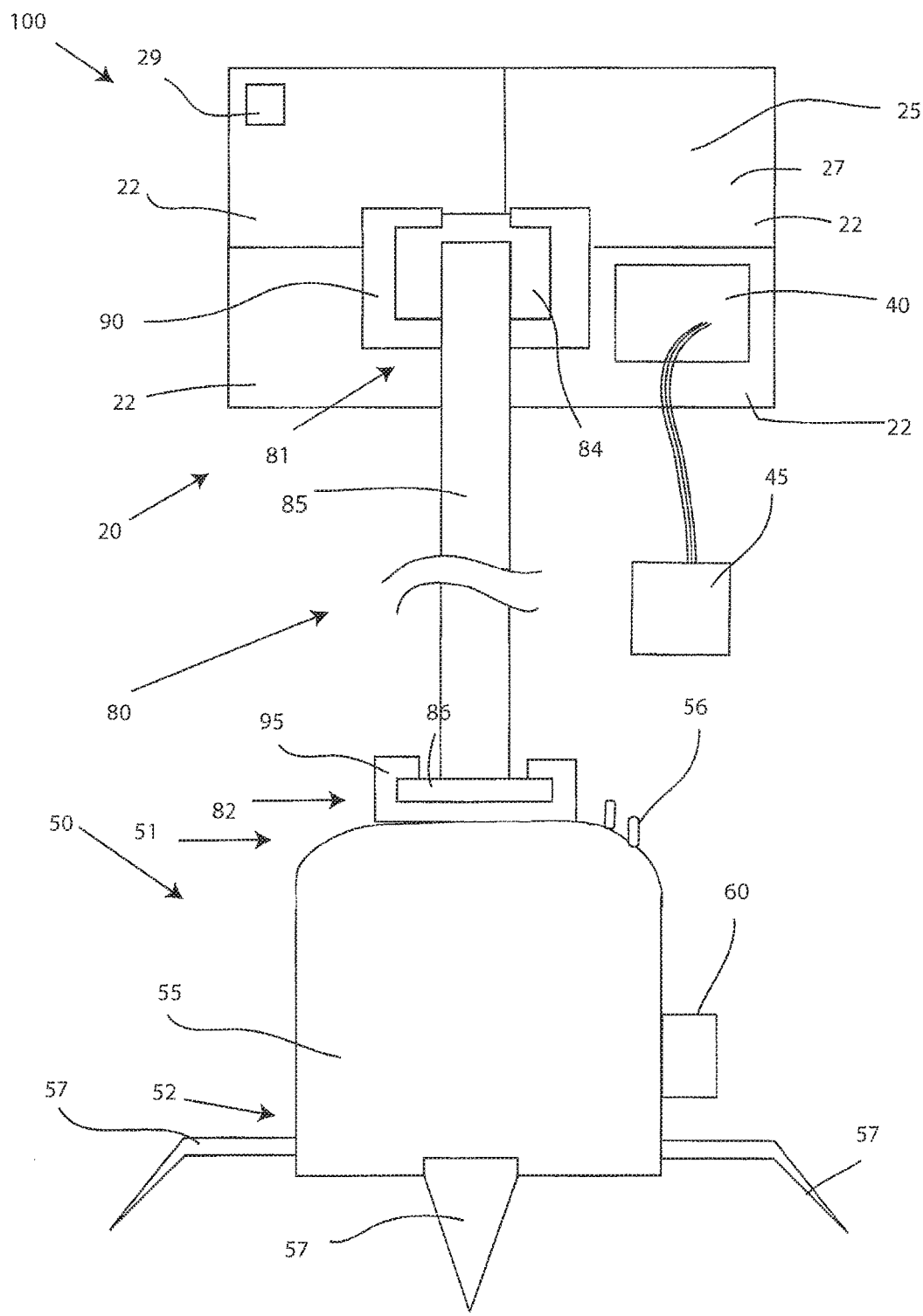
FIG. 13 depicts a rear view of an embodiment of a solar powered rechargeable device.

Embodiments of the solar radiation collection portion 20 may also include a first receptacle 45 coupled to the charge controller 40. The first receptacle 45 may be coupled to the charge controller through a cable or other means which may support the flow, or transfer, of electrical energy (e.g. current). For instance, the first receptacle 45 can be external to the charge controller 40 (i.e. connected via a cable) or the first receptacle 45 may be integrated into the body of the charge controller 40. The first receptacle 45 may be a socket, receptacle, jack, or other electrical connection device that may accept electrical pins or contacts from an electrical plug, such as the plug 15 of an electronic device 5, and battery plug 56. The first receptacle 45 may be in electrical communication with the charge controller 40 and the first solar panel 25 via the charge controller 40. Moreover, the first receptacle 45 may be configured to accept or electrically mate with a plurality of electrical pins or electrical contacts of the plug 15 of an electronic device 5 to establish an electrical connection. The mating of the first receptacle 45 and the plug 15 of an electronic device 5 may charge the electronic device 5, as shown in FIG. 12. For example, the electrical energy converted/produced by the solar radiation collection portion 20 through absorption of solar radiation 21 by the first and second solar panels 25, 28, may be transferred from first and second solar panels 25, 28 to the electronic device 5 through the mating of the first receptacle 45 and the plug 15 of the electronic device 5.

Referring still to FIGS. 1 and 7, embodiments of the solar radiation collection portion 20 may include a counterweight 29 coupled to the second side 27 of the first solar panel 25. The counterweight 29 may be coupled to the second side 27 of the first solar panel 25 to counter the weight of the charge controller 40 which may also be coupled to the first solar panel 25. For example, the weight of the charge controller 40 may increase the torque exerted onto the connection member 85. Thus, to decrease the torque, a counterweight 29 may be coupled to an opposing or different sector 22 of the first solar panel 25. In most embodiments, the counterweight 29 may be a non-conductive, dense member having a thin cross-section to avoid complicating (e.g. restricting the folds) the folding process of the first solar panel 25. Alternatively, the counterweight 29 may be a conductive member, such as a metal, if coupled to a non-conductive layer forming the second side 27 of the first solar panel 25. Embodiments of the counterweight 29 may comprise polymeric materials, elastomeric materials, hard plastics, and the like. Those skilled in the art should appreciate that other means to counter the weight of the charge controller 40 may be employed in device 100.

Figure 8:
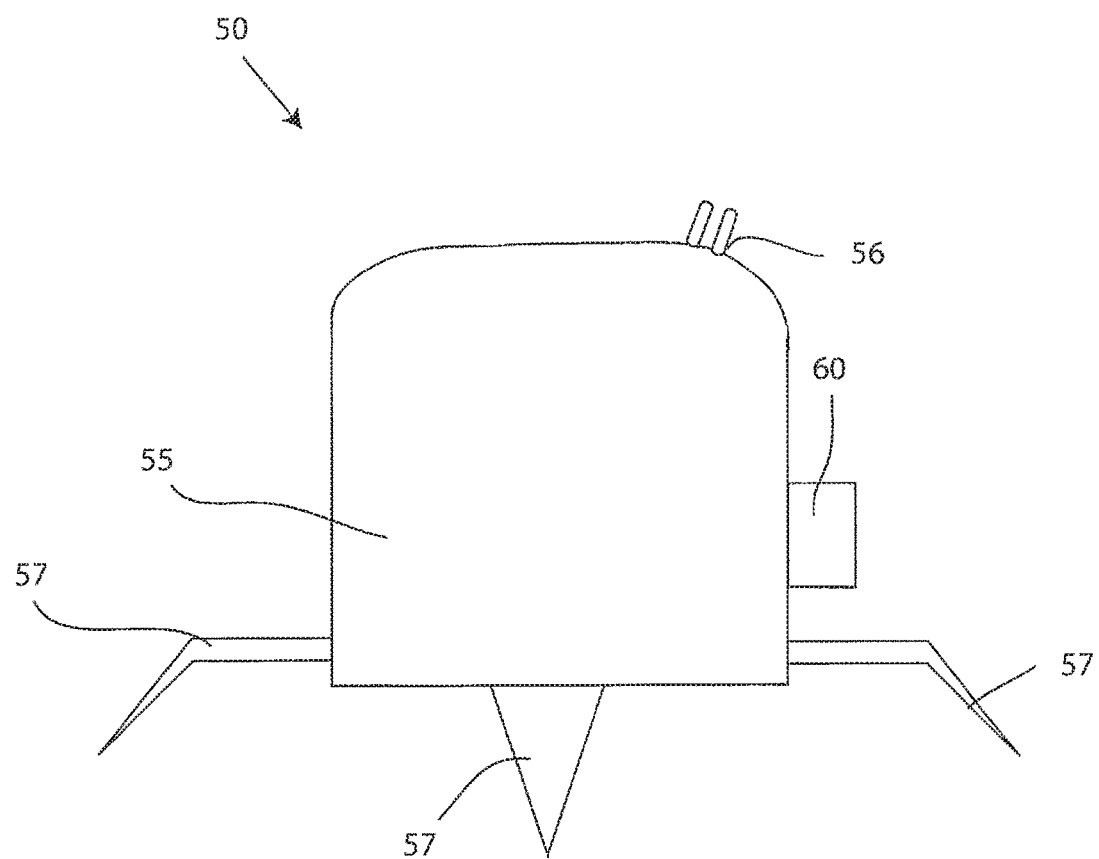
FIG. 8 depicts a rear view of an embodiment of a base portion.

Referring now to FIGS. 1 and 8, embodiments of the solar powered rechargeable device 100 may include a base portion 50. Embodiments of the base portion 50 may include a battery unit 55, a plurality of legs 57, a battery plug 56, and a second receptacle 60. The base portion 50 may provide stability to the solar powered rechargeable device 100. For instance, the base portion 50 may directly interact with a surface, such as the surface of the Earth, when device 100 is operably configured and being used to charge a battery of an electronic device 5 or the battery unit 55.

Embodiments of the base portion 50 may include a battery unit 55 having a top end 51 and a bottom end 52. The battery unit 55 may refer to a housing enclosing a rechargeable battery, or may comprise a rechargeable battery, the outer surface being integral with the rechargeable battery. The battery unit 55 may comprise a rechargeable battery, or storage battery, that may include one or more electrochemical cells. For instance, the battery unit 55 may be a lead-acid battery, nickel-cadmium (NiCd), nickel metal hydride (NiMH), lithium-ion (Li-ion), lithium-ion polymer (Li-ion polymer), or other rechargeable battery known to those skilled in the art, having the ability to recharge, charge, and/or power an electronic device 5, such as a cellular phone, satellite phone, laptop, mp3 player, smartphone, and the like.

The structure of the battery unit 55, or outer housing of the battery unit 55, may vary, but should be sized and configured to withstand the load of the connection portion 80 and the solar radiation collection portion 20, while also withstanding cross winds or other lateral forces that may be exerted onto the battery unit 55. Further embodiments of the structure of the battery unit 55 may include ergonomic grips and/or surface features that may facilitate the gripping of the battery unit 55. For instance, the outer surface of the battery unit may include recessions or grooves that correspond to shape of a clenched hand, or may include a knurled surface to facilitate the gripping of the battery unit 55. Alternatively, a sleeve may be placed over a portion of the battery unit 55 to facilitate the gripping of the battery unit 55 in the field. The sleeve may surround or substantially surround a middle portion (i.e. a portion between the top end 51 and the bottom end 52) of the battery unit 55.

To further provide stability and control, the battery unit 55 may include a plurality of legs 57 proximate the bottom end 52. The plurality of legs 57 may be attached to the bottom end 52 of the battery unit 55 either fixedly or hingedly. For example, the plurality of legs 57 may be rigidly fastened to the battery unit 55 proximate the second end 52 such that the plurality of legs 57 is integral with the battery unit 55 (e.g. casted as the same piece). Alternatively, the plurality of legs 57 may be retractable. The plurality of legs 57 may be hingedly attached to the battery unit 55 proximate the bottom end 52 through a hinged mechanical connection that may allow the plurality of legs 57 to hinge outward from underneath the battery unit 55 to provide stability to the device 100. For ease of storage in a pocket, backpack, or other compartment, the plurality of legs 57 may then hinge inward underneath the battery unit 55 to save space. However, those skilled in the art should appreciate that other means to allow for retraction of the legs 57 may be used. Further embodiments of the legs 57 may have a bended configuration, or comparable angled orientation to raise the device 100 a certain distance above the ground. An additional hinge joint may allow a bended portion of the legs 57 to also hinge, pivot, etc.

Figure 9:
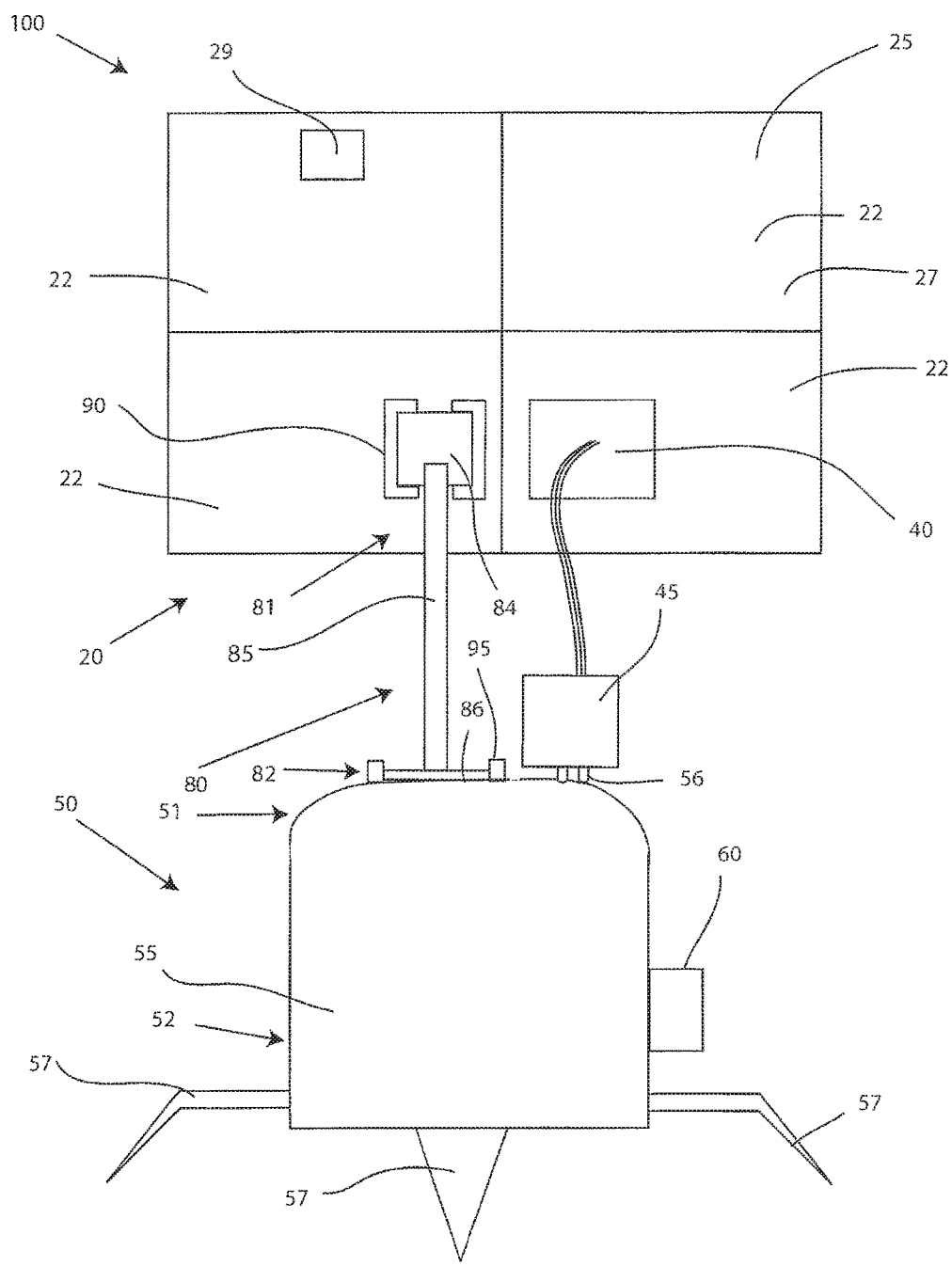
FIG. 9 depicts a rear view of an embodiment of the solar powered rechargeable device charging the battery unit.

Referring still to FIGS. 1 and 8, a battery plug 56 may be located on the outer surface of the battery unit 55, or protrude from the internals of the battery unit 55, proximate or otherwise near the top end 51. The battery plug 56 may be in electrical communication with the battery unit 55, and may be any type of plug known to those skilled in the art, including two pin/contact plugs, three pin/contact plugs, or other multi-conductor plugs. Moreover, the battery plug 56 may be a plurality of electrical pins or electrical contacts (e.g. male contacts) configured to mate with the first receptacle 45 of the solar radiation collection portion 20 to establish an electrical connection. Specifically, the mating of the battery plug 56 and the first receptacle 45 may charge the battery unit 55, as shown in FIG. 9. For example, the electrical energy converted/produced by the first and second solar panels 25, 28 from solar radiation 21 may be transferred from the charge controller 40 through the first receptacle 45, and upon mating with the battery plug 56, the electrical energy from the solar radiation 21 may charge the battery unit 55.

Figure 10:
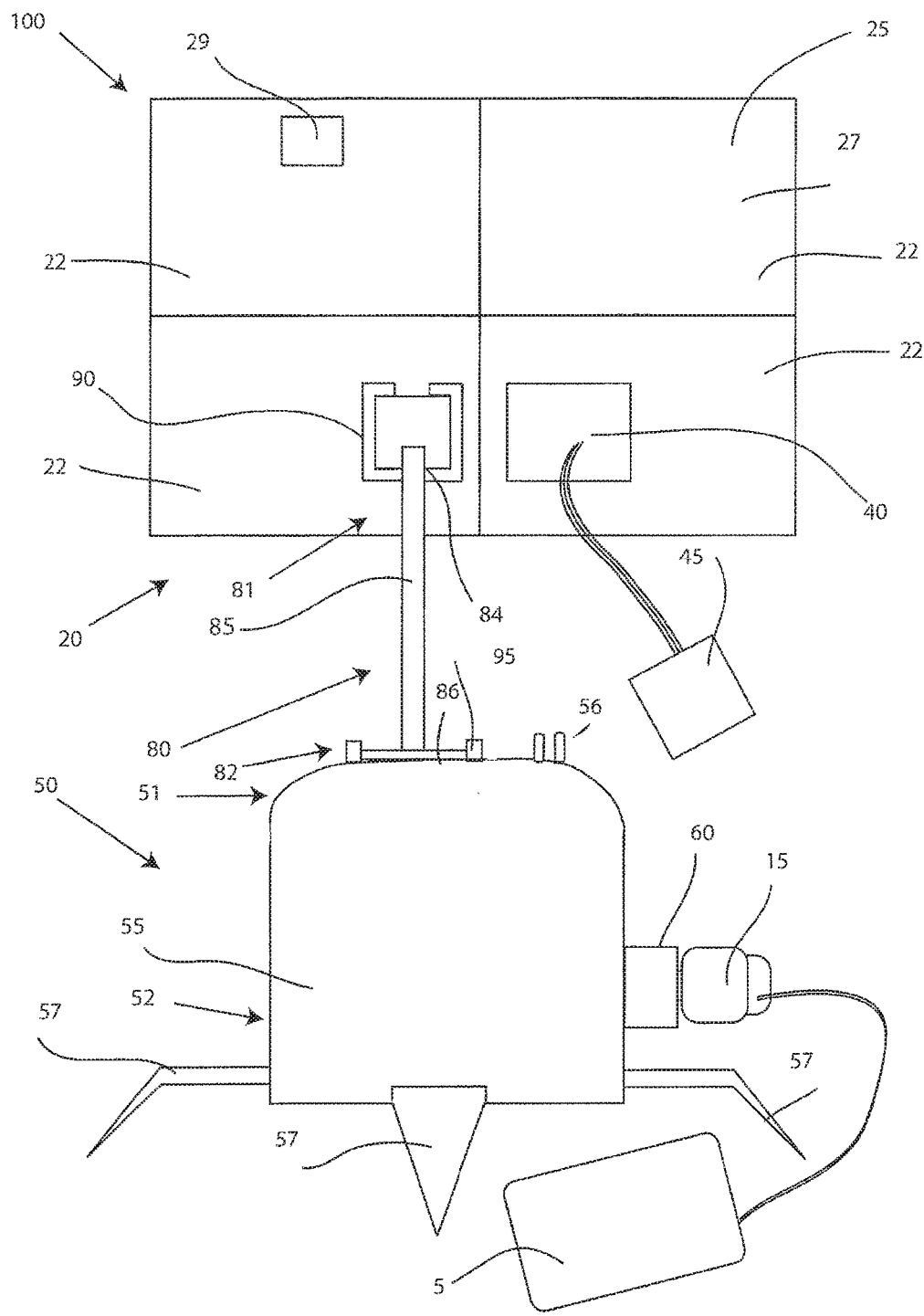
FIG. 10 depicts a rear view of an embodiment of the battery unit charging an electronic device.

Embodiments of the base portion 50 may further include a second receptacle 60 located on the outer surface of the battery unit 55 (i.e. externally), or located inside the battery unit 55 (i.e. internally) wherein the electrical pins/contacts of a plug 15 from an electronic device may be inserted, proximate or otherwise near the top end 51. The second receptacle 60 may be a socket, receptacle, jack, or other electrical connection device that may accept electrical pins or contacts from an electrical plug, such as the plug 15 of an electronic device 5 The second receptacle 60 may be in electrical communication with the battery unit 55. Moreover, the second receptacle 60 may be configured to accept or electrically mate with a plurality of electrical pins or electrical contacts of the plug 15 of an electronic device 5 to establish an electrical connection. The mating of the second receptacle 60 and the plug 15 of an electronic device 5 may charge the electronic device 5, as shown in FIG. 10. For example, the electrical energy stored in the battery unit 55 received from the solar radiation collection portion 20 through conversion of solar radiation 21 by the first and second solar panels 25, 28, may be transferred from the battery unit 55 to the electronic device 5 through the mating of the second receptacle 60 and the plug 15 of the electronic device 5.

Figure 11:
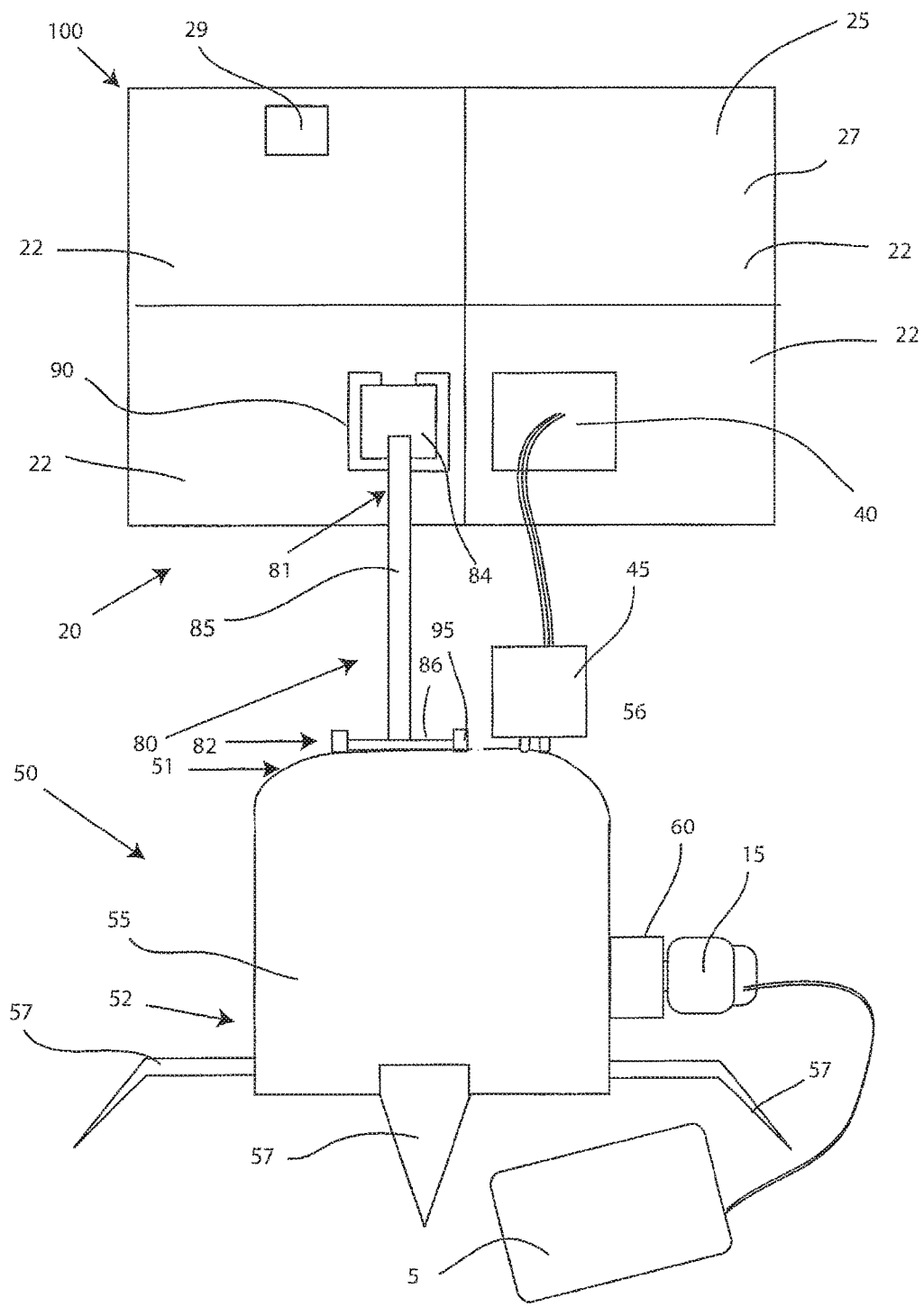
FIG. 11 depicts a rear view of an embodiment of the solar powered rechargeable device charging the battery unit and the electronic device.

Furthermore, an electronic device 5 may be powered, charged, and/or recharged while the first receptacle 45 is mated with the battery plug 56, as shown in FIG. 11. The plug 15 of an electronic device 5 may be plugged into the second receptacle 60 while the first receptacle 45 is mated with the battery plug 56. This allows the electronic device 5 to be powered from the stored energy of the battery unit 55, while additional electrical energy is being transferred from the solar radiation collection portion 20. Alternatively, as depicted in FIG. 12, the electronic device 5 may be directly connected to the solar radiation collection portion 20 to charge, power, and/or recharge the electronic device 5 in instances where the battery unit 55 does not have sufficient stored energy, or where the stored energy in the battery unit 55 should be saved for later consumption. For instance, the plug 15 of the electronic device 5 may be plugged into the first receptacle 45 of the solar radiation collection portion 20 to receive electrical energy.

Thus, a person in an environment or situation which does not have a power source, such as an alternating current (AC) source, or a backup DC power source, such as a backup battery, may use device 100 to power, charge, and/or recharge an electronic device 5. Additionally, a person may store electrical energy into the battery unit 55 during the daylight without exposing or unpacking their electronic device 5, and later unpack and use and/or charge the electronic device 5 during the nighttime. Device 100 may provide the ability to use electronic devices in the field for a prolonged period of time, without the need for an AC power source. Furthermore, utilization of solar radiation 21 to electrically power, charge, and/or recharge electronic devices is vastly less expensive and extremely courteous to the environment. For example, utilizing solar radiation 21 eliminates the need to generate electricity through conventional means.

Referring now to FIGS. 1, 13, and 14A-14C, embodiments of device 100 may include a connection portion 80 operably connecting the solar radiation collection portion 20 to the base portion 50. The connection portion 80 may erect the solar radiation collection portion 20 from the base portion 50. Embodiments of the connection portion 80 may include a first clip 90 coupled to the first solar panel 25, a second clip 95 coupled to the battery unit 55, and a connection member 85 having a first end 81 and a second end 82.

Figure 14A:
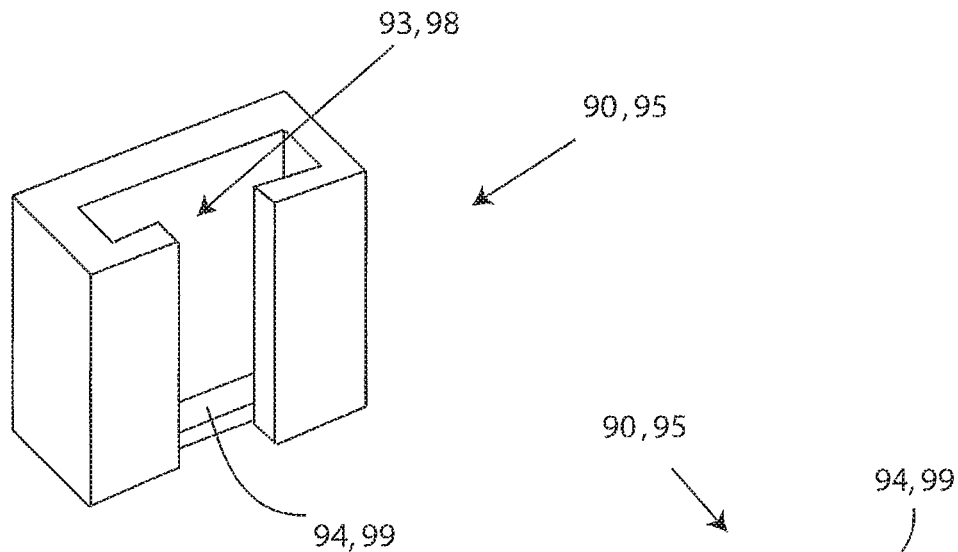
FIG. 14A depicts a perspective view of an embodiment of a clip of a connection portion.
Figure 14B:
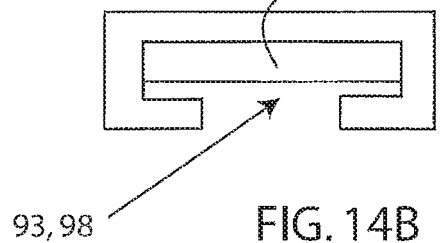
FIG. 14B depicts a top view of an embodiment of the clip of the connection portion.

Embodiments of the connection portion 80 may include a first clip 90 coupled to the first solar panel 25. For example, the first clip 90 may be fastened, coupled, attached, adhered, fixed, etc., to the second side 27 of the first solar panel 25, such that the first clip 90 is coplanar with the first solar panel 25. The first clip 90 may have an internal cavity 93 which may accept a first end 81 of the connection member 85, as shown in FIGS. 14A-14B. The internal cavity 93 may have a cross-section that corresponds to the cross-section of the first end 81 of the connection member 85. For example, the dimensions of the first end 81 of the connection member 85 may be slightly smaller than the internal cavity 93 to fit within the internal cavity 93 snugly, but may be manually removed with relative ease. The first clip 90 may also include a stopper 94 proximate or otherwise near the bottom end 92 of the first clip 90 to prevent further movement of the first end 81 of the connection member 85 towards the base portion 50. For instance, the first clip 90 may accept the first end 81 of the connection member 85 as the first end 81 of the connection member 85 enters the cavity 93 in a parallel arrangement. The stopper 94 of the first clip 90 prevents, stops, hinders, etc., further translational downward movement of the first end 81 of the connection member 85.

Figure 14C:
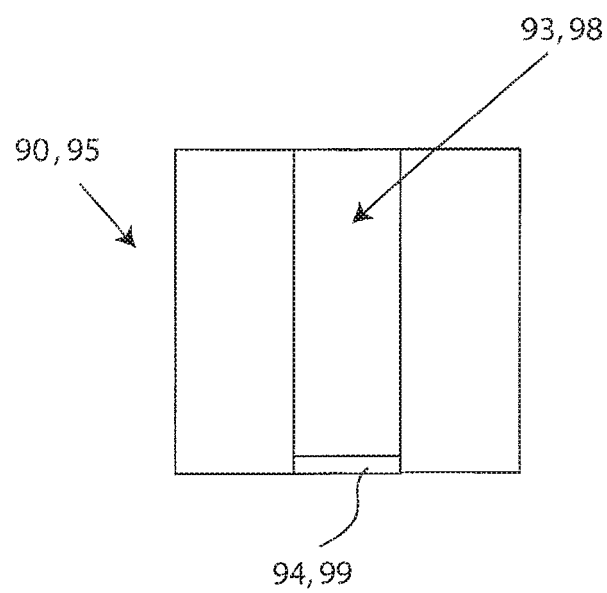
FIG. 14C depicts a front view of an embodiment of the clip of the connection portion.

Embodiments of the connection portion 80 may also include a second clip 95 coupled to the battery unit 55. For example, the second clip 95 may be fastened, coupled, attached, adhered, fixed, etc., to the outer surface of the battery unit 55 at a location where the outer surface of the battery unit 55 is flat or substantially flat. The second clip 95 may have an internal cavity 98 which may accept a second end 82 of the connection member 85, as shown in FIGS. 14A-14C. The internal cavity 98 of the second clip 95 may have a cross-section that corresponds to the cross-section of the second end 82 of the connection member 85. For example, the dimensions of the second end 82 of the connection member 85 may be slightly smaller than the internal cavity 98 to fit within the internal cavity 98 snugly, but may be manually removed with relative ease. The second clip 95 may also include a stopper 99 proximate or otherwise near the bottom end 96 of the second clip 95 to prevent further movement of the second end 82 of the connection member in a lateral direction away from the battery unit 55. For instance, the second clip 95 may accept the second end 82 of the connection member 85 as the second end 82 of the connection member 85 enters the cavity 98 in a parallel arrangement. The stopper 99 of the second clip 95 prevents, stops, hinders, etc., further translational lateral movement of the second end 82 of the connection member 85.

Moreover, embodiments of the connection portion may include a connection member 85 having a first end 81 and a second end 82, wherein the connection member 85 separates the base portion 50 from the solar radiation collection portion 20. The middle portion 83 of the connection member 85 (i.e. between the first end 81 and the second end 82) may be a hollow or solid member, having a circular, rectangular, square, or other polygonal cross-section. Coupled to the hollow or solid member proximate or otherwise near the first end 81 may be a first block member 84 which may fit within the internal cavity 93 of the first clip 90. The first block member 84 attached to the first end 81 of the connection member 85 may be dimensioned to fit snugly within internal cavity 93, but may be manually removed with relative ease. The first block member 84 may have a parallel relationship with the middle portion 83 of the connection member 85. Likewise, coupled to the hollow or solid member proximate or otherwise near the second end 82 may be a second block member 86 which may fit within the internal cavity 98 of the second clip 95. The second block member 86 attached to the second end 82 of the connection member 85 may be dimensioned to fit snugly within internal cavity 98, but may be manually removed with relative ease. The second block member 86 may have a perpendicular relationship with the middle portion 83 of the connection member 85. Thus, when the first end 81 and the second end 82 of the connection member, in particular, the first and second block member 84, 86, are operably attached to the first and second clip 90, 95, respectively, the first solar panel 25 may be erected and separated from the base portion 50.

Alternative connection means may be used to allow rotational movement of the connection member 85. For example, the connection member 85 may rotate 360° to alter the position of the first solar panel 25. The connection means to allow for rotational movement of the connection member 85 may replace the second clip 95 and second block member 86 with a mechanical means to allow rotational movement of the connection member 85. For instance, the second end 82 of the connection member 85 may be inserted through a congruent hole or opening in the outer surface of the battery unit 55 proximate the top end 51 and rotatably retained in the hole by employing mechanical means such as retaining clips, snap rings, circlips, flaring the lip of the connection member 85 or a combination of such mechanical means. Therefore, the connection member 85 may be rotatable, and through rotation of the connection member 85, the first solar panel 25 may also rotate correspondingly.

Referring now to FIGS. 1-14C, a method for charging an electronic device 5 may comprise the steps of collecting solar radiation 21 with a first solar panel 25, wherein the first solar panel 25 is foldable into a plurality of sectors 22, positioning a concentrator 33 a distance above the first solar panel 25 to concentrate the solar radiation 21 onto a portion of the first solar panel 25, structurally connecting a battery unit 55 to the first solar panel 25, wherein the battery unit 55 has a plurality of legs 57 to provide stability, electrically coupling a first receptacle 45 to the first solar panel 25 to transfer electrical energy from the first solar panel 25 to at least one of the battery unit 55 and an electronic device 5, and mating the first receptacle 45 with the electronic device 5 to charge the electronic device 5. The method may also include the steps of coupling a counterweight 29 to the first solar panel 25, coupling a second solar panel 28 to the first solar panel 25, and coupling a charge controller 40 to the first solar panel 25 to control the flow of electrical energy produced by the first solar panel 25.

Figure 15:
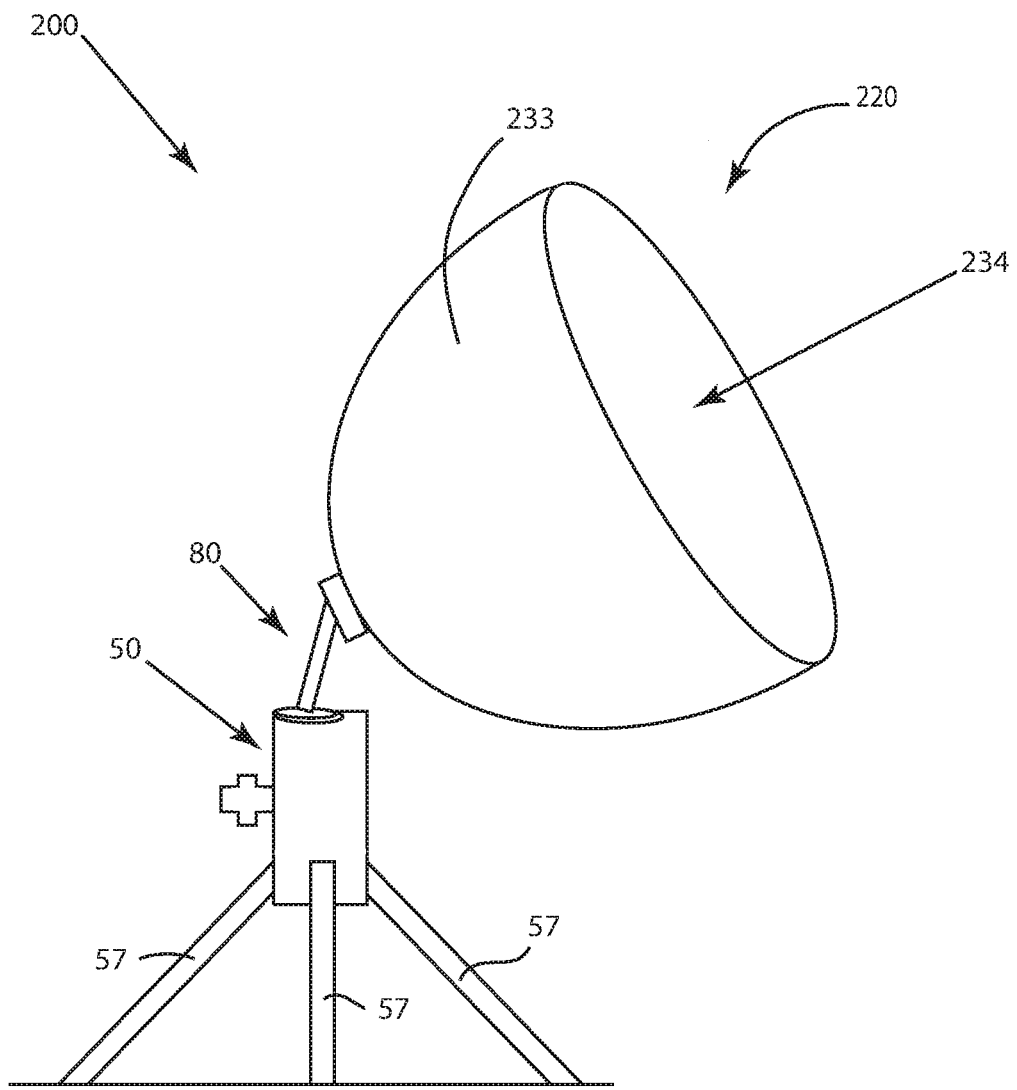
FIG. 15 depicts a perspective view of a second embodiment of a solar collection device having a concentrator surrounding a solar panel.
Figure 16:
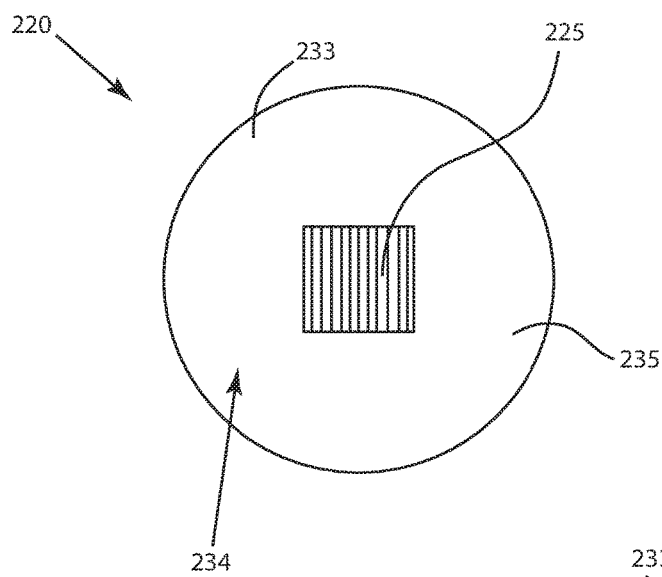
FIG. 16 is a front view of an embodiment of a solar radiation collection portion.
Figure 17:
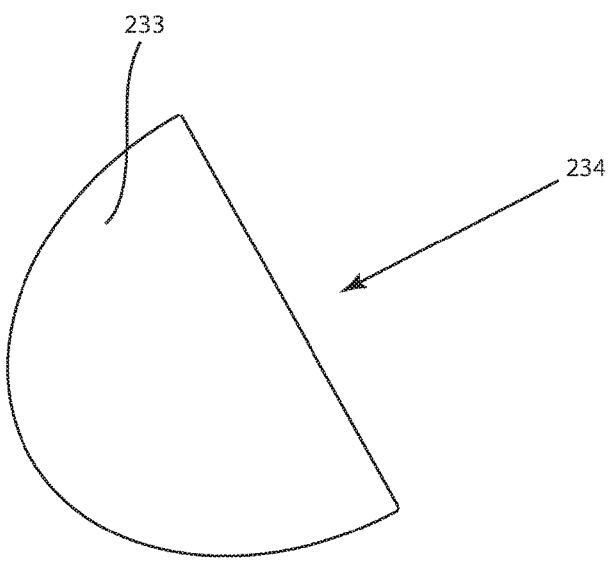
FIG. 17 is a side view of an embodiment of the solar radiation collection portion.

Referring now to FIGS. 15-17, an embodiment of device 200 is depicted having a solar radiation collection portion 220 including a solar panel 225 and a concentrator 233. Embodiments of device 200 may also include a charge controller 40 coupled to the solar radiation collection portion 220, the charge controller 40 electrically coupled to a first receptacle 45, a base portion 50, the base portion 50 may include a battery unit 55, a plurality of legs 57, wherein a second receptacle 60 can be coupled to the battery unit 55, and a connection portion 80 operably connecting the solar radiation collection portion 220 to the base portion 50, the connection portion 80 including a connecting member 85 having a first end 81 and a second end 82. Embodiments of the device 200 and solar radiation collection portion 200 may share the same or substantially aspects, structural or functional, as device 100 and solar radiation collection portion 20, respectively.

Embodiments of the solar radiation collection portion 220 may include a concentrator 233. The concentrator 233 may be a parabolic trough partially or substantially encompassing a solar panel 225. The concentrator 233 may have various other shapes than a parabola. Embodiments of the concentrator 233 may receiving the solar panel 225, and may surround the solar panel 225, except for opening 234 of the concentrator 233 to allow entry of the solar radiation. The solar panel 225 may be positioned at or proximate the center of the concentrator 233 on an inner reflective surface 235, as shown in FIG. 16. Moreover, embodiments of the concentrator may have a reflective inner surface 235 for reflecting, refracting, deflecting, redirecting, focusing, etc., an incoming solar radiation towards the solar panel 225 positioned therein. For example, embodiments of the concentrator 233 may have an opening 234 for allowing entry of radiation, wherein some of the incoming radiation will contact the solar panel 225 directly, while the remaining radiation can be reflected off of the inner surface 235 of the concentrator 233 and directed toward the solar panel 225. Furthermore, embodiments of the concentrator 233 may be rotatable, wherein the solar panel 225 may rotate along with the concentrator 233, with respect to the base portion 50.

Embodiments of the solar panel 225 may be electrically connected/coupled independently to a power receiving unit, such as charge controller 40, as described in association with device 100 and solar panels 25 and 28. The solar panel 225 may be may be tuned to work most efficiently for a particular wavelength of light, infrared light or monochromatic light when availability of the entire spectrum of light is compromised (e.g. clouds, shadows, etc). Furthermore, the solar panel 225 may be a photovoltaic module, or solar panel. For instance, the solar panel 225 may be a monocrystalline silicon wafer, or a thin film photovoltaic module.

While the above has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims. The claims provide the scope of the coverage of the invention and should not be limited to the specific examples provided herein.

What is claimed is:

1. A mobile solar powered charging device for charging an electronic device using solar radiation, the mobile solar powered charging device comprising:
   a solar radiation collection panel, wherein the solar radiation collection panel is foldable such that when a first sector of the panel is folded, the first sector faces a second sector of the panel;
   a charge controller electrically and physically coupled directly to the solar radiation collection panel, the charge controller regulating a flow of current from the solar radiation collection panel, wherein the charge controller is included with the solar radiation collection panel such that folding the solar radiation collection panel results in a movement of the charge controller and the solar radiation collection panel as a single unit;
   wherein the single unit is a user carryable mobile unit for charging a portable electronic device.

2. The mobile solar powered charging device of claim 1, further comprising a battery unit electrically coupled to the charge controller.

3. The mobile solar powered charging device of claim 2, further comprising a receptacle electrically coupled to the battery unit, the receptacle including a mating means for establishing a mated, electrical connection with the electronic device.

4. The mobile solar powered charging device of claim 2, further comprising a second receptacle electrically coupled to the battery unit, the second receptacle including a second mating means for establishing a second mated, electrical connection with a second electronic device.

5. The mobile solar powered charging device of claim 1, wherein the electronic device is a computing device.

6. The mobile solar powered charging device of claim 1, wherein the solar radiation collection panel in rotatable.

7. The mobile solar powered charging device of claim 1, further comprising a concentrator detachably attached to the mobile solar powered charging device.

8. A solar powered rechargeable device comprising:
   a solar panel, the solar panel having a first side and a second side;
   a battery unit;
   a charge controller coupled to the second side of the solar panel, wherein the charge controller controls the electrical energy converted by the solar panel, wherein a movement of the solar radiation collection panel results in a movement of the charge controller and the solar radiation collection panel as a single unit; and
   a first receptacle electrically coupled to the charge controller, the first receptacle configured to accept an electrical plug from an electronic device to establish a first electrical connection;
   wherein the solar powered rechargeable device is a user carryable mobile unit for charging a portable electronic device.

9. The solar powered rechargeable device of claim 8, further comprising a base portion, wherein the battery unit is disposed within the base portion.

10. The solar powered rechargeable device of claim 8, wherein the solar panel is rotatable.

11. The solar powered rechargeable device of claim 8, further comprising a second solar panel coupled to the first side of the solar panel.

12. The solar powered rechargeable device of claim 8, further comprising a concentrator detachably attached to the device.

13. A method of charging an electronic device comprising:
   collecting solar radiation with a solar panel, wherein the solar panel is foldable such that when a first sector of the panel is folded, the first sector faces a second sector of the panel;
   regulating a flow of current from the solar radiation collection panel through a charge controller, wherein the charge controller is electrically and physically coupled to the solar radiation collection panel such that folding the solar radiation collection panel results in a movement of the charge controller and the solar radiation collection panel as a single unit;
   transferring electrical energy to a battery unit that is electrically coupled to the solar panel;
   transferring electrical energy stored within the battery unit to the electronic device using a receptacle electrically coupled to the battery unit; and
   wherein the single unit is a user carryable mobile unit for charging a portable electronic device.

14. The method of claim 13, wherein the receptacle mates with a corresponding receptacle of the electronic device.

15. The method of claim 13, wherein a connection member structurally connects the battery unit and the solar panel.

* * * * *